(12) United States Patent
Fujiwara et al.

(10) Patent No.: US 10,737,744 B2
(45) Date of Patent: Aug. 11, 2020

(54) BICYCLE OPERATING DEVICE

(71) Applicant: Shimano Inc., Sakai, Osaka (JP)

(72) Inventors: Takaaki Fujiwara, Osaka (JP);
Tatsuya Matsushita, Osaka (JP);
Yoshimitsu Miki, Osaka (JP);
Kazutaka Fukao, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/840,828

(22) Filed: Dec. 13, 2017

(65) Prior Publication Data
US 2018/0105226 A1    Apr. 19, 2018

Related U.S. Application Data

(63) Continuation of application No. 14/609,893, filed on Jan. 30, 2015, now Pat. No. 9,896,150.

(51) Int. Cl.
*B62L 3/02* (2006.01)
*B60T 7/10* (2006.01)
(Continued)

(52) U.S. Cl.
CPC .............. *B62L 3/023* (2013.01); *B60T 7/102* (2013.01); *B62K 21/125* (2013.01); *B62K 23/06* (2013.01)

(58) Field of Classification Search
CPC ......... B62L 3/023; B62L 3/02; B62K 21/125; B62K 23/06; B60T 7/102; B60T 7/10; B60T 11/102; B60T 11/165; B60T 11/18; B60T 11/22; B60T 11/16; B62M 25/04; B62M 25/02; Y10T 74/20438
See application file for complete search history.

(56) References Cited

U.S. PATENT DOCUMENTS 3,742,777 A * 7/1973 Mathauser ............. B62M 25/08
474/81
4,462,267 A    7/1984 Shimano
(Continued)

FOREIGN PATENT DOCUMENTS

CN    103507903 A    1/2014
DE    502132 C    7/1930
(Continued)

OTHER PUBLICATIONS

JPO Translation of JP 3182207 U, Nakakura et al., Mar. 14, 2013 (Year: 2018).*

*Primary Examiner* — Daniel DD Yabut
(74) *Attorney, Agent, or Firm* — Global IP Counselors, LLP

(57) ABSTRACT

A bicycle operating device is basically provided with a main support body, a first operating member, a hydraulic brake operating unit, an additional operating unit and a second operating member. The main support body is configured to be attached to a handlebar. The first operating member is pivotally coupled to the main support body about a first pivot axis. The hydraulic brake operating unit is mounted to the main support body. The hydraulic brake operating unit has a piston operated in response to operation of the first operating member between a rest position to an operated position. The additional operating unit is mounted to the main support body. The second operating member is configured to actuate the additional operating unit.

19 Claims, 9 Drawing Sheets

(51) Int. Cl.
*B62K 21/12* (2006.01)
*B62K 23/06* (2006.01)

(56) References Cited

U.S. PATENT DOCUMENTS

| | | |
|---|---|---|
| 5,241,878 A | 9/1993 | Nagano |
| 6,502,675 B1 | 1/2003 | Andrus |
| 7,124,873 B2 | 10/2006 | Tsumiyama |
| 7,210,694 B2 | 5/2007 | Trenne |
| 8,297,143 B2 | 10/2012 | Fujii et al. |
| 2005/0029772 A1 | 2/2005 | Oi |
| 2005/0056011 A1 | 3/2005 | Idei et al. |
| 2007/0137387 A1 | 6/2007 | Dal Pra |
| 2007/0175290 A1 | 8/2007 | Fujii |
| 2009/0152063 A1 | 6/2009 | Tsai |
| 2010/0083788 A1 | 4/2010 | Jordan et al. |
| 2010/0199798 A1 | 8/2010 | Uno |
| 2010/0224740 A1* | 9/2010 | Hirose .................. B60T 7/102 248/124.2 |
| 2011/0011197 A1 | 1/2011 | Oku et al. |
| 2011/0031079 A1 | 2/2011 | Matsushita |
| 2016/0264213 A1* | 9/2016 | Swanson ................ B62L 3/023 |

FOREIGN PATENT DOCUMENTS

| | | | |
|---|---|---|---|
| DE | 4400641 A1 | 3/1995 | |
| EP | 0 875 443 A2 | 4/1998 | |
| GB | 190403651 A | 5/1904 | |
| JP | 2005-53363 A | 3/2005 | |
| JP | 3182207 U * | 3/2013 | ........... B62M 25/00 |

* cited by examiner

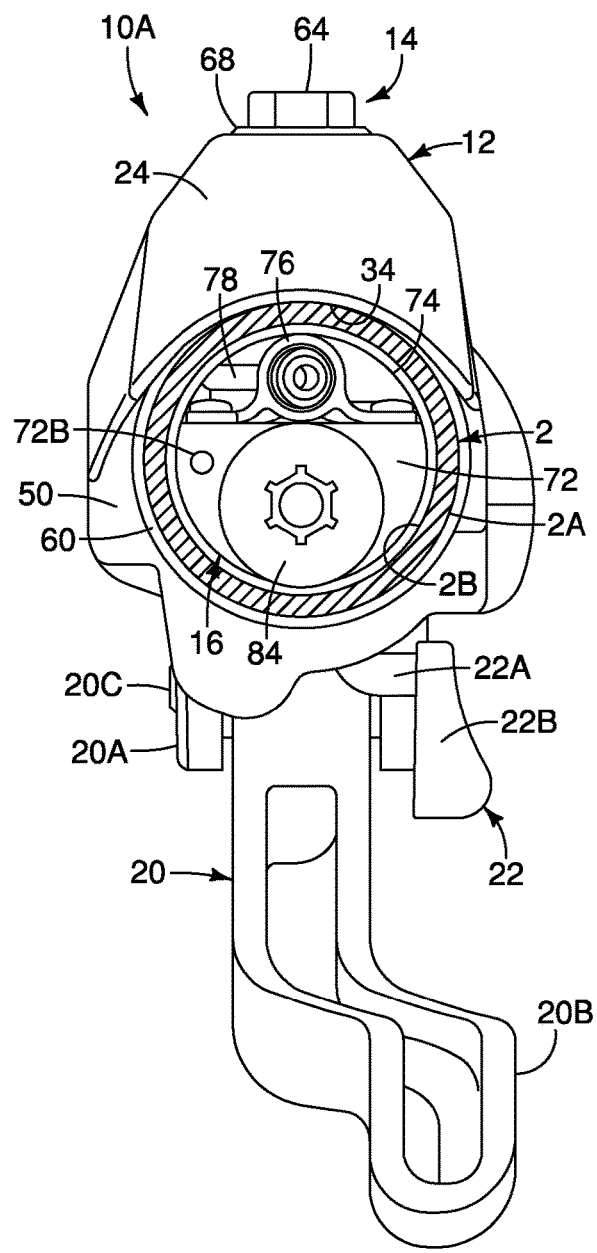 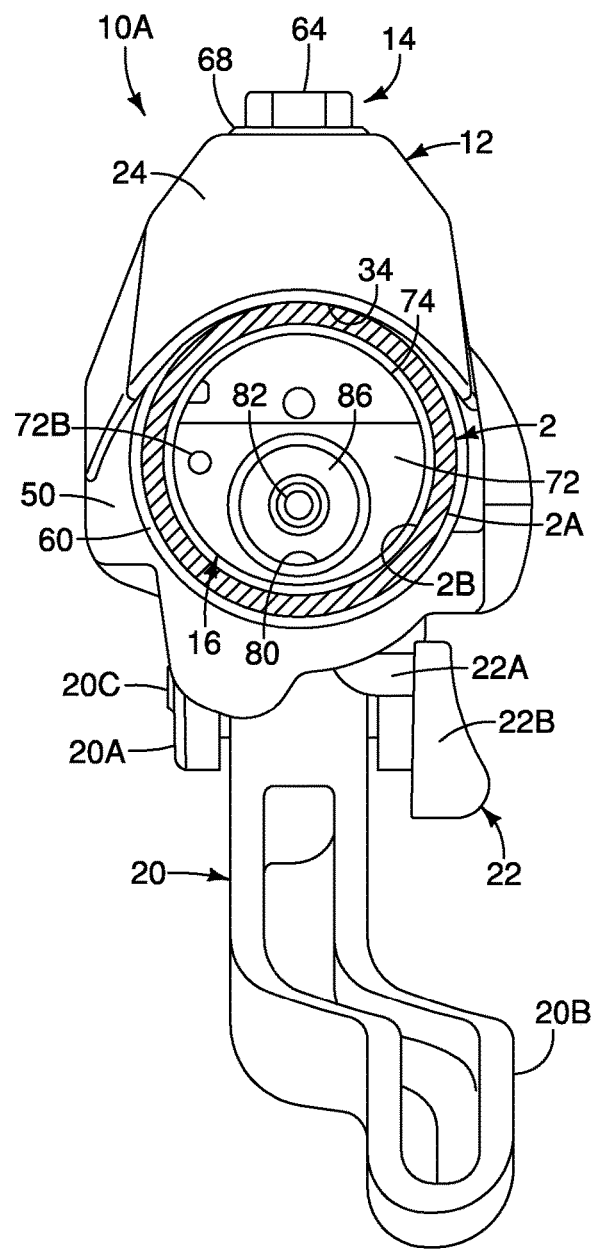
FIG. 9
FIG. 10

BICYCLE OPERATING DEVICE

CROSS-REFERENCE TO RELATED APPLICATIONS

This application is a continuation application of U.S. patent application Ser. No. 14/609,893 filed on Jan. 30, 2015. The entire disclosure of U.S. patent application Ser. No. 14/609,893 is hereby incorporated herein by reference.

BACKGROUND

Field of the Invention

This invention generally relates to a bicycle operating device. More specifically, the present invention relates to a bicycle operating device that is mounted to an external surface of an end of a handlebar. In one configuration, the bicycle operating device includes a hydraulic operating device that may be used for actuating a brake device.

Background Information

Typically, most bicycles are provided with handlebar mounted operating devices for operating various bicycle components of a bicycle. In the past, the handlebar mounted operating devices were mechanical operating devices that are attached to the handlebars and connected to one or more bicycle components (e.g., a brake device or a transmission, a suspension) via a push-pull control cable (e.g., a Bowden cable) to enable operation of the bicycle component(s). More recently, bicycles have provided with hydraulic operating devices and/or electric operating devices. A hydraulic operating device is connected to one or more bicycle hydraulically actuated components via one or more hydraulic hoses, while an electric operating device is connected to one or more bicycle electrically actuated components via one or more electrical cables. Herein, the push-pull control cables, hydraulic hoses and electrical cables are generically referred to as control lines. Conventionally, these control lines have typically been fastened along the outside of a bicycle frame and other hollow members such as the handlebars. However, more recently, cables are sometimes inserted inside of these hollow members to preserve an external appearance of the bicycle and for protection of the cables. One example of a bicycle that has cables disposed inside of hollow members of the bicycle is disclosed in U.S. Patent Application Publication No. 2005/0029772.

In the case of a time trial bicycle, a bull horn handlebar is often used that curve forward away from the rider that allows the rider to ride in a tuck position. Typically, each end of the bull horn handlebar is provided with a "handlebar-end operating device" that has an attachment portion that is disposed inside the end of the bull horn handlebar. In some instances, these bar-end operating devices can include both a shift operating device and a brake operating device. One example of a bar-end operating device having an attachment portion that is disposed inside the end of the bull horn handlebar is disclosed in U.S. Patent Application Publication No. 2011/0011197.

SUMMARY

Generally, the present disclosure is directed to various features of a bicycle operating device. In one feature, a bicycle operating device is provided that is mounted to an external surface of an end of a handlebar in such a manner so as to free up the space inside the end of a handlebar for receiving one or more of an operating unit, a control cable, a hydraulic hose, etc.

In view of the state of the known technology and in accordance with a first aspect of the present disclosure, a bicycle operating device is provided is basically provided with a main support body, a first operating member, a hydraulic brake operating unit, an additional operating unit and a second operating member. The main support body is configured to be attached to a handlebar. The first operating member is pivotally coupled to the main support body about a first pivot axis. The hydraulic brake operating unit is mounted to the main support body. The hydraulic brake operating unit has a piston operated in response to operation of the first operating member between a rest position to an operated position. The additional operating unit is mounted to the main support body. The second operating member is configured to actuate the additional operating unit.

Also, other objects, features, aspects and advantages of the disclosed bicycle operating device will become apparent to those skilled in the art from the following detailed description, which, taken in conjunction with the annexed drawings, discloses one embodiment of the bicycle operating device.

BRIEF DESCRIPTION OF THE DRAWINGS

Referring now to the attached drawings which form a part of this original disclosure:

FIG. 9 is a rear end elevational view of the right bicycle operating device illustrated in FIGS. 2 to 8, with the right free end of the handlebar shown in cross section;

FIG. 10 is a rear end elevational view, similar to FIG. 9, of the right bicycle operating device, but with the hydraulic brake hose connector and the cylinder plug removed;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
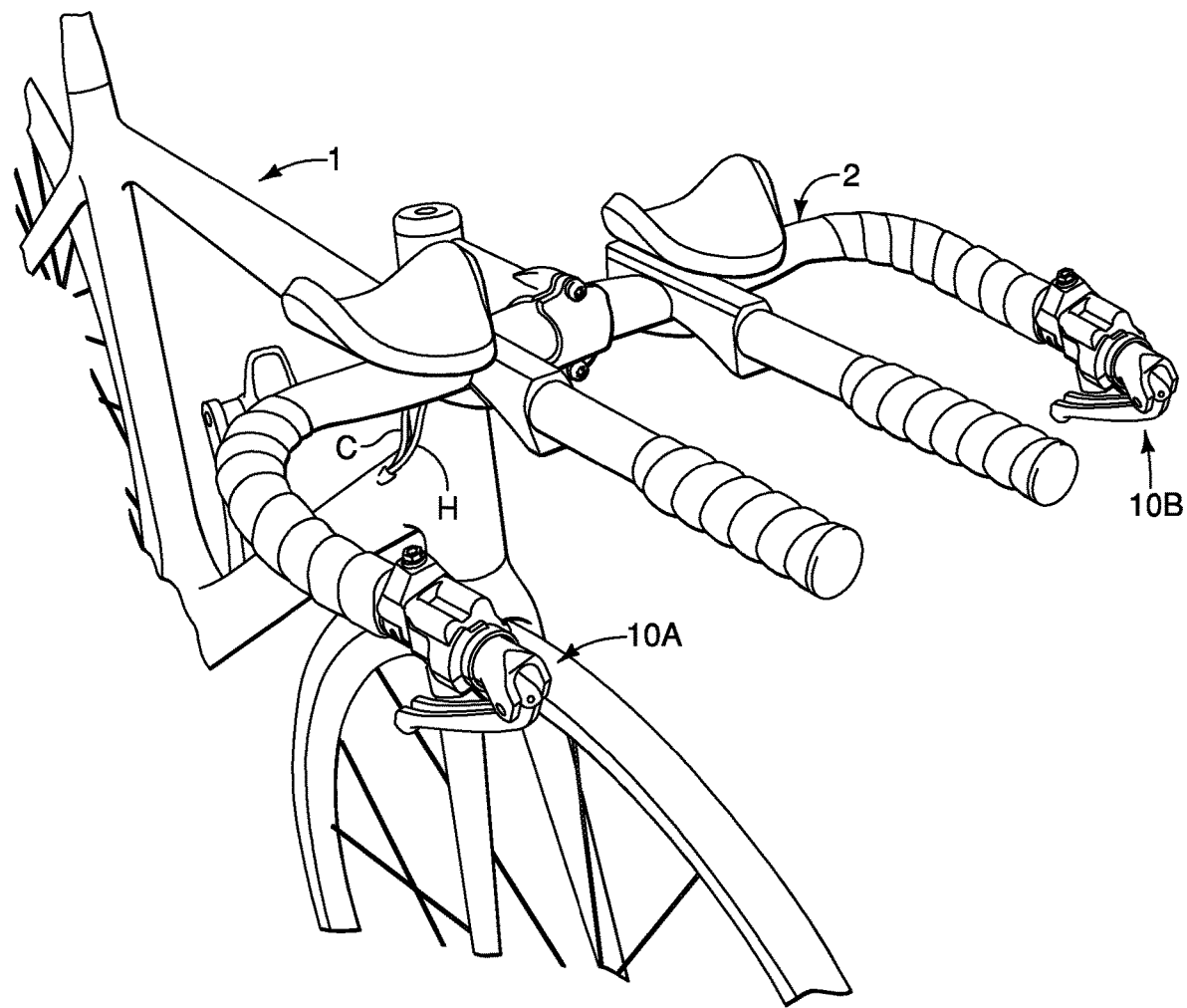
FIG. 1 is a partial front perspective view of a time trial bicycle having a bull horn handlebar that is equipped with a pair of bicycle operating devices in accordance with a first embodiment.

Referring initially to FIG. 1, a portion of a bicycle 1 is illustrated having a handlebar 2 with a pair of bicycle operating devices 10A and 10B in accordance with a first embodiment. The bicycle operating devices 10A and 10B are configured to be mounted to opposite ends of the handlebar 2, respectively. Here in the first embodiment, the handlebar 2 is a time trial or bull horn handlebar in which the bicycle operating devices 10A and 10B are attached to the free ends of the handlebar 2 as explained below.

Basically, as seen in FIG. 1, the bicycle operating device 10A is a right hand side control device that is operated by the rider's right hand to actuate a first hydraulic brake device (not shown) and a first transmission (not shown), e.g. a front derailleur, a rear derailleur, or an internal transmission device. The bicycle operating device 10B is a left hand side control device that is operated by the rider's left hand to actuate a second hydraulic brake device (not shown) and a second transmission (not shown), e.g. a front derailleur, a rear derailleur, or an internal transmission device. The first and second transmission or gear shifting devices are part of a conventional bicycle driving system that is used to change speed stages or gear stages of the drive train in a relatively conventional manner. The bicycle operating devices 10A and 10B are operatively coupled to the first and second hydraulic brake devices (not shown) via hydraulic brake hoses H, respectively, and to the transmissions (not shown) via control cables C, respectively.

Figure 2:
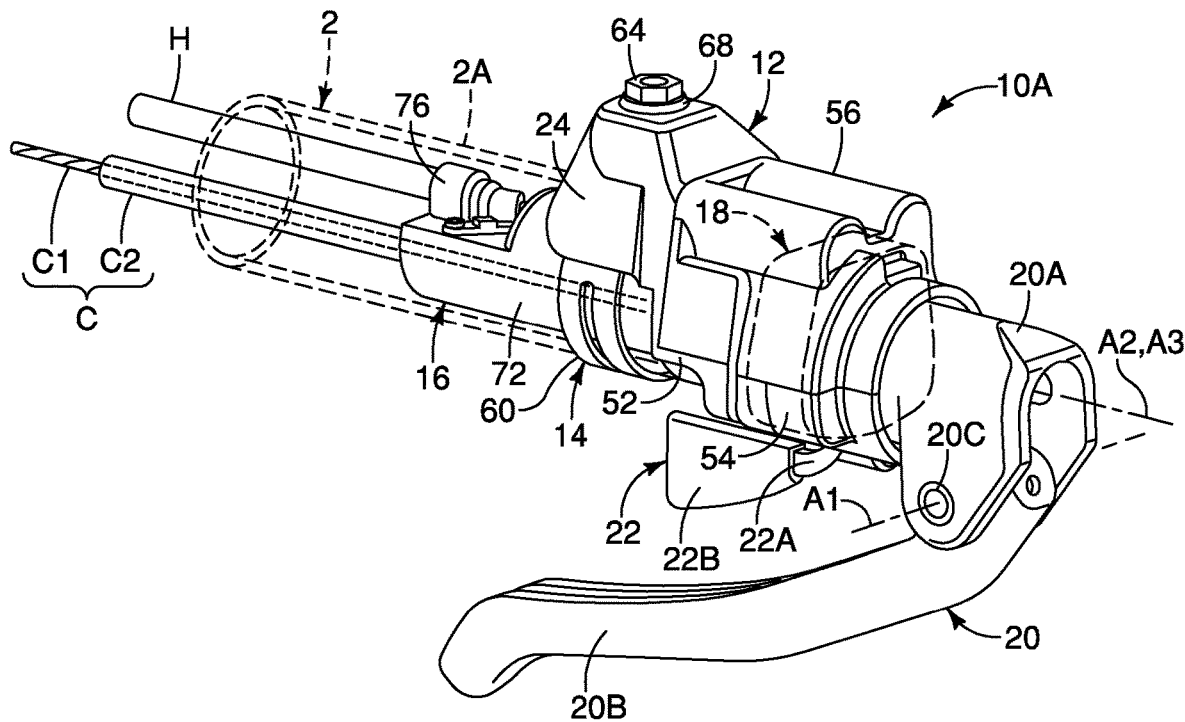
FIG. 2 is an outside perspective view of the right bicycle operating device that is attached to the right free end of the handlebar illustrated in FIG. 1, with the right free end of the handlebar shown in broken lines to better illustrate the shift control cable and the hydraulic brake hose that are disposed inside the handlebar.
Figure 3:
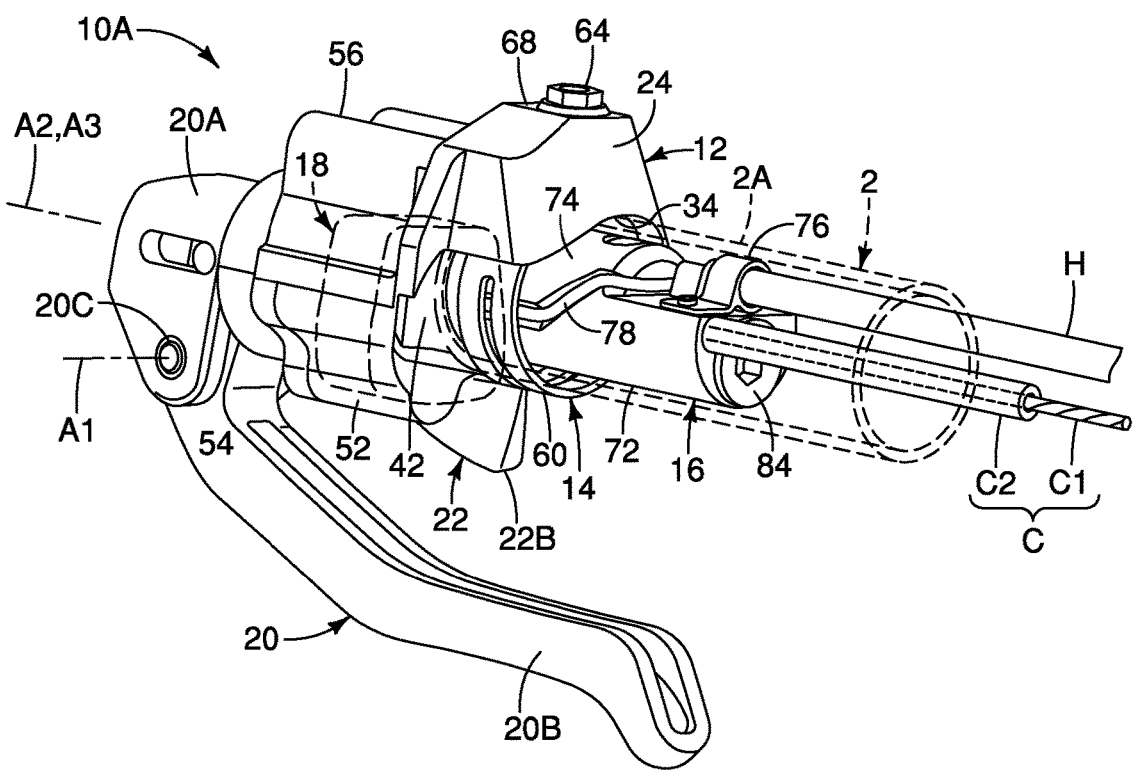
FIG. 3 is an inside perspective view of the right bicycle operating device that is attached to the right free end of the handlebar illustrated in FIGS. 1 and 2, with the right free end of the handlebar shown in broken lines to better illustrate the shift control cable and the hydraulic brake hose that are disposed inside the handlebar.

As seen in FIGS. 2 and 3, the hydraulic brake hoses H are flexible hydraulic hoses that are conventionally used in the bicycle field. The control cables C are conventional Bowden cables that each includes an inner cable C1 and an outer casing C2 which at least partially covers the inner cable C1. Of course, the hydraulic brake hoses H and the control cables C are not limited to the illustrated hoses and cables.

Since the bicycle operating devices 10A and 10B are each configured to operate both a transmission and a hydraulic brake device, the bicycle operating devices 10A and 10B are also known as bicycle brifters. In other words, a bicycle brifter is a device that includes both a braking function and a shifting function in a single unit that is mounted to the bicycle. In the illustrated embodiment, the right and left bicycle operating devices 10A and 10B are essentially identical in operation, except that they are mirror images of each other and they may have a different number of shift operations. Thus, for the sake of brevity, only the bicycle operating device 10A will be discussed and illustrated herein.

Referring to FIGS. 2 to 13, the bicycle operating device 10A basically comprises a main support body 12, an external handlebar fixing structure 14 and an operating unit 16. The operating unit 16 is mounted to the main support body 12. In the first embodiment, as explained below, the external handlebar fixing structure 14 is also mounted to the main support body 12. Thus, the operating unit 16 is supported on the handlebar 2 by the external handlebar fixing structure 14 via the main support body 12. In the first embodiment, the bicycle operating device 10A further comprises an additional operating unit 18 that is mounted to the main support body 12. The additional operating unit 18 is supported on the handlebar 2 by the external handlebar fixing structure 14 via the main support body 12.

The bicycle operating device 10A further comprises a first operating member 20. In the first embodiment, the bicycle operating device 10A further comprises a second operating member 22. The first and second operating members 20 and 22 are both used to operate the additional operating unit 18 as explained below. The first operating member 20 is also used to operate the operating unit 16 as explained below. Depending on the configuration of the additional operating unit 18, the second operating member 22 can be omitted so that the additional operating unit 18 is solely operated by the first operating member 20.

Figure 6:
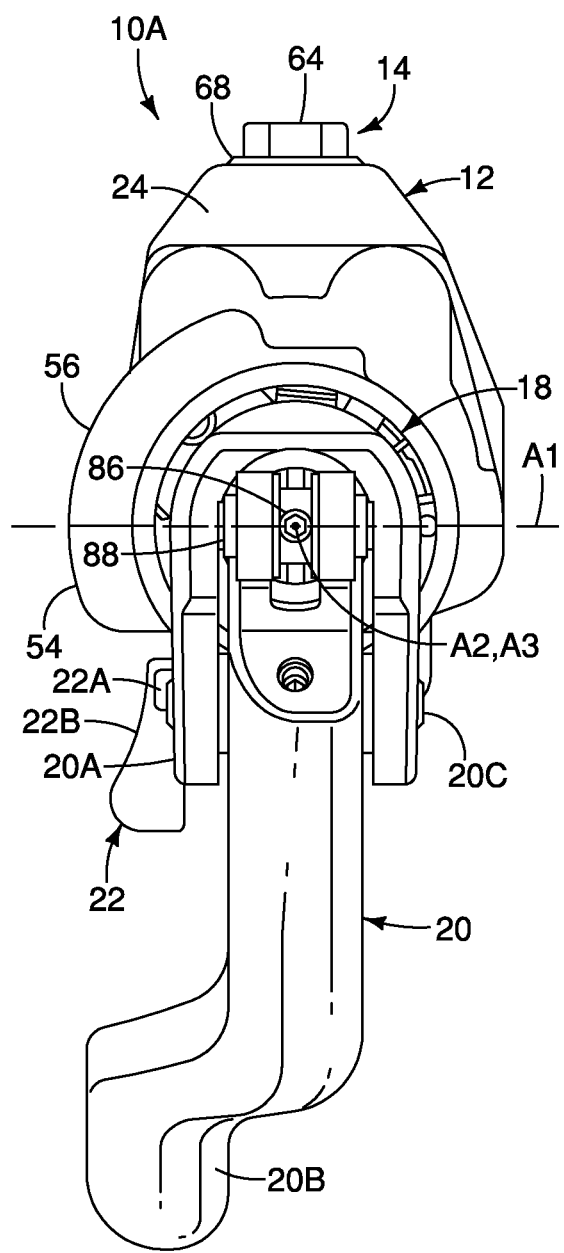
FIG. 6 is a front end elevational view of the right bicycle operating device illustrated in FIGS. 2 to 5, with the first and second operating members in their rest positions.
Figure 7:
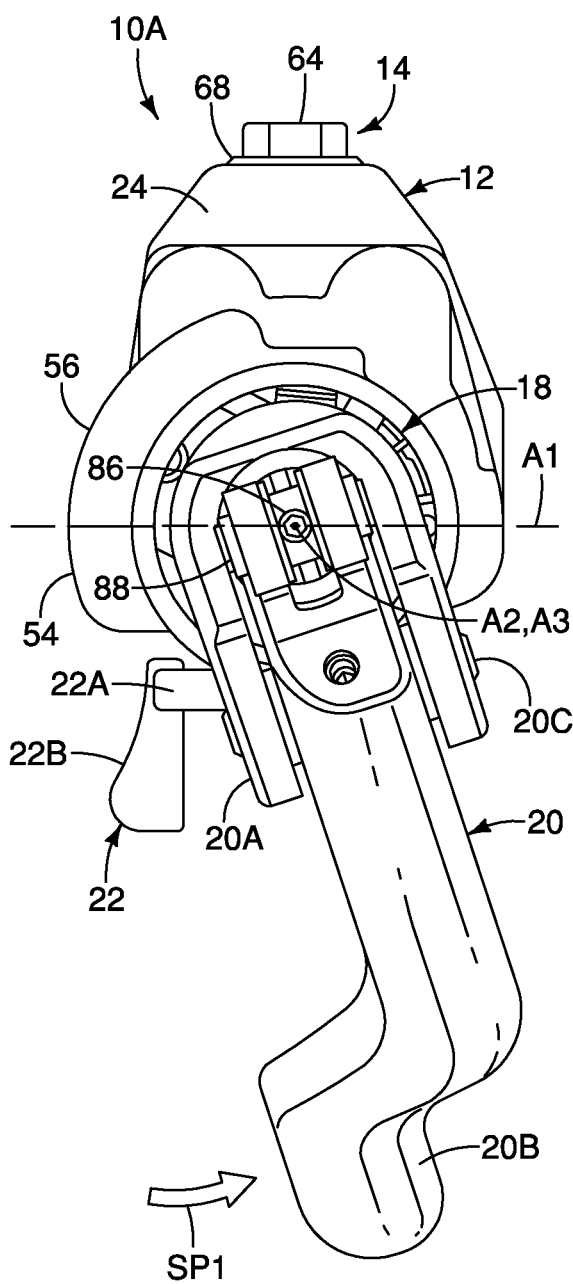
FIG. 7 is a front end elevational view, similar to FIG. 6, of the right bicycle operating device, but with the first operating member in an operated position to operate the additional (shift) operating unit and the second operating member in the rest position.
Figure 8:
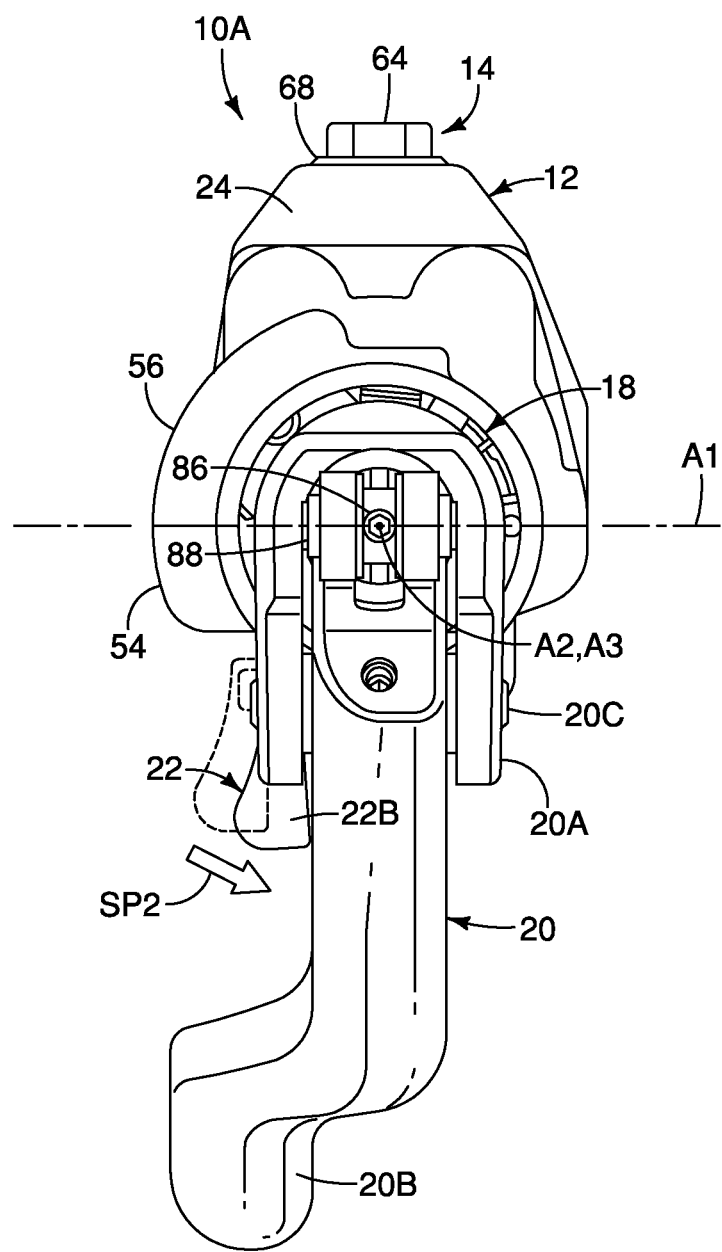
FIG. 8 is a front end elevational view, similar to FIGS. 6 and 7, of the right bicycle operating device, but with the second operating member in an operated position and the first operating member in the rest position.

Also as explained below, the first and second operating members 20 and 22 are trigger levers that are biased to their rest positions such that they automatically return to the their rest position upon being released from an operated position. FIGS. 2 to 4, 6, 9 and 10 illustrate the bicycle operating device 10A with its various parts in their rest positions, while FIGS. 5, 7 and 8 illustrate the bicycle operating device 10A with selected parts held in operated positions. The term "rest position" as used herein refers to a state in which a movable part (e.g., the first and second operating members 20 and 22) remains stationary without the need of a user intervening (e.g., holding the movable part) to establish a state corresponding to the rest position. Thus, the term "rest position" can also be referred to as a non-operated position. The term "end position" as used herein refers a state in which a movable part (e.g., the first and second operating members 20 and 22) is prevent from be moved further away from the rest position in a movement direction of a movement stroke of that movable part. The term "operated position" as used herein refers a state in which a movable part (e.g., first and second operating members 20 and 22) is moved from the rest position to a position as a result of an external force being applied to the movable part.

Figure 4:
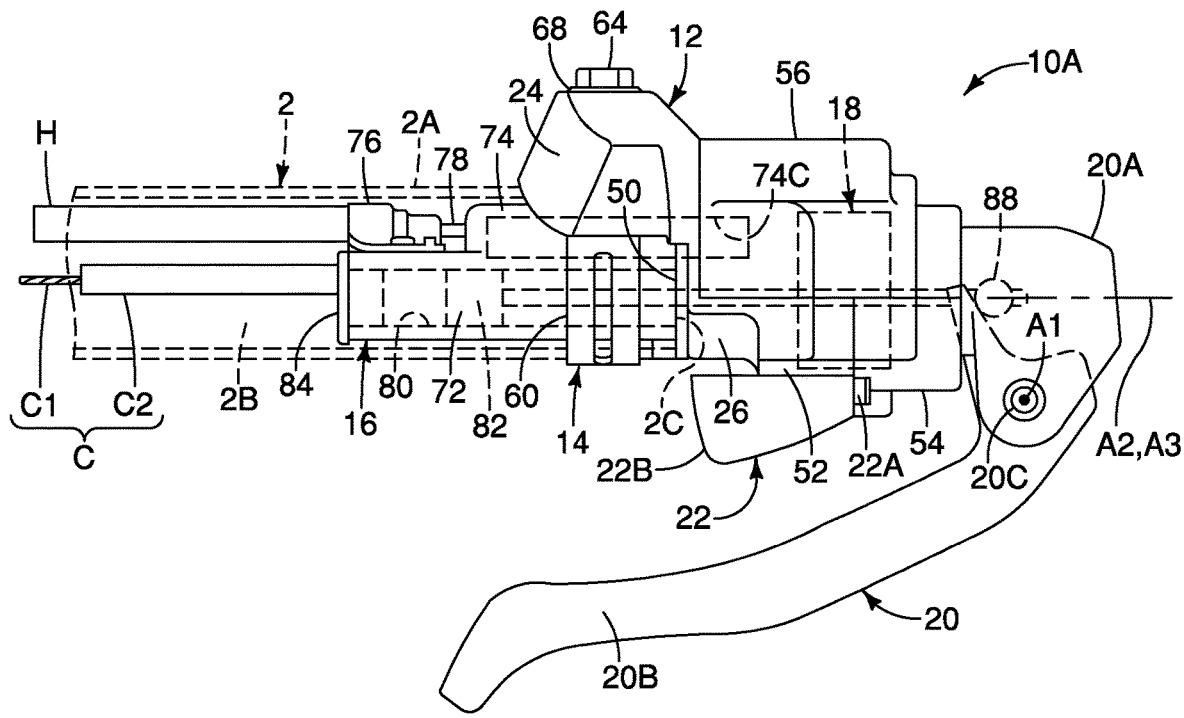
FIG. 4 is an outside end elevational view of the right bicycle operating device illustrated in FIGS. 2 and 3, with the first and second operating members in their rest positions.
Figure 5:
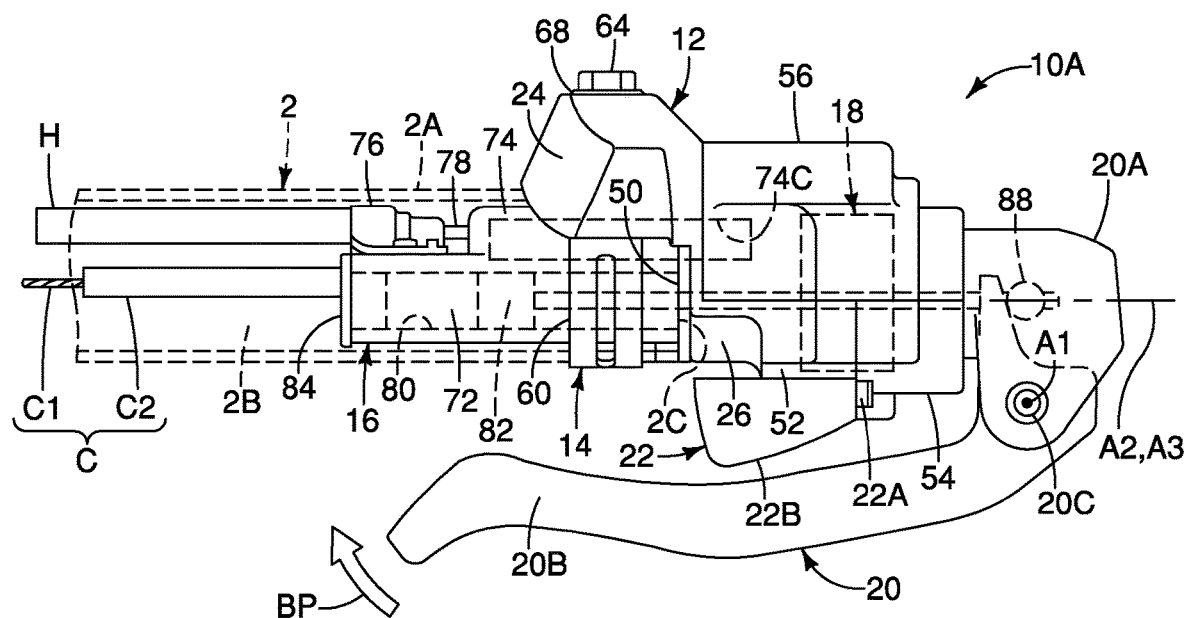
FIG. 5 is an outside end elevational view, similar to FIG. 4, of the right bicycle operating device, but with the first operating member in an operated position to perform a braking operation and the second operating member in the rest position.

As seen in FIGS. 4 and 5, the first operating member 20 basically includes a base member 20A, a lever member 20B and a pivot pin 20C. The lever member 20B is pivotally mounted to the base member 20A by the pivot pin 20C. Thus, the first operating member 20 is pivotally mounted relative to the main support body 12 around a first pivot axis A1 to actuate the operating unit 16. The first pivot axis A1 is defined by the pivot pin 20C. As seen in FIGS. 6 and 7, the first operating member 20 is also configured to be pivoted around a second pivot axis A2 to actuate the additional operating unit 18. The second pivot axis A2 is different from the first pivot axis A1. In particular, the base member 20A is coupled to the additional operating unit 18 to pivot about the second pivot axis A2. In the first embodiment, the second pivot axis A2 is arranged perpendicular to the first pivot axis A1. Typically, as in the case of the first embodiment, the base member 20A has a pulling member mounted thereon for rotating a cable take-up member 18a (FIG. 11) of the additional operating unit 18 in a first direction around the second pivot axis A2.

With this configuration, the first operating member 20 is configured to perform a braking operation when moved along a braking path BP (FIG. 5) generally parallel to a center longitudinal plane of the bicycle 1, and a cable pulling operation when moved along a first shifting path SP1 (FIG. 7) towards the center longitudinal plane of the bicycle 1. The additional operating unit 18 remains stationary (i.e., not actuated) as the first operating member 20 pivots with respect to the main support body 12 around the first pivot axis A1 to perform the braking operation.

As seen in FIG. 8, the second operating member 22 basically includes a base member 22A and a lever member 22B. The base member 22A is pivotally mounted to the additional operating unit 18. Specifically, in the first embodiment, the second operating member 22 is pivotally mounted relative to the main support body 12 around a third pivot axis A3 to actuate the additional operating unit 18. In the first embodiment, the second and third pivot axes A2 and A3 are coaxially arranged. With this configuration, the second operating member 22 is configured to perform a cable releasing operation when moved along a second shifting path SP2 (FIG. 8) towards the center longitudinal plane of the bicycle 1. As a result of the operation of the second operating member 22, the cable take-up member 18a (FIG. 11) of the additional operating unit 18 is rotated in a second direction around the second and third pivot axes A2 and A3.

It will be apparent to those skilled in the bicycle field from this disclosure that while the bicycle operating device 10A is illustrated having two operating units, the bicycle operating device 10A could be constructed with only one operating unit. In the first embodiment, the operating unit 16 is a hydraulic brake operating unit, and the additional operating unit 18 is a mechanical cable shift operating unit. It will be apparent to those skilled in the bicycle field from this disclosure that the operating units of the bicycle operating device 10A are not limited to the illustrated embodiment. For example, one or both of the operating units could be an electric operating unit. Moreover, the operating units of the bicycle operating device 10A are not limited to being used for operating a brake device and a transmission.

Now, the main support body 12 will be discussed in more detail with primary reference to FIGS. 3 and 9 to 13. Basically, the main support body 12 is fastened onto an exterior surface 2A of the handlebar 2 by the external handlebar fixing structure 14. The main support body 12 and the external handlebar fixing structure 14 do not extend into an interior 2B of the handlebar 2. The main support body 12 basically includes a first (handlebar) attachment portion 24 and a second (operating unit) attachment portion 26. Here, the first and second attachment portions 24 and 26 are integrally formed together as a single or one-piece member from a suitable material such as a hard, rigid plastic or a metal. The external handlebar fixing structure 14 is supported by the first attachment portion 24, while the operating units 16 and 18 are supported by the second attachment portion 26. In the first embodiment, as seen in FIGS. 12 and 13, the main support body 12 includes a guiding structure 28 that directs a cable (the inner cable C1) extending from the additional operating unit 18 to inside the handlebar 2 in a state where the bicycle operating device 10A is mounted to the handlebar 2. In the first embodiment, the guiding structure 28 is a curved tube that is press-fitted into a hole 30 of the first attachment portion 24. However, the guiding structure is not limited to the illustrated guiding structure. For example, depending on the configuration of the additional operating unit 18, the guiding structure 28 could be omitted such that the hole 30 of the first attachment portion 24 constitutes the guiding structure.

In the first embodiment, as seen in FIGS. 3, 9 and 10, the first attachment portion 24 has a handlebar contact surface 34 that contacts the exterior surface 2A of the handlebar 2. In particular, as the external handlebar fixing structure 14 is tightened, the handlebar contact surface 34 drawn into contact with the exterior surface 2A by the handlebar contact surface 34 that contacts the exterior surface 2A. In the first embodiment, as seen in FIG. 13, the first attachment portion 24 has a mounting opening 36 for attaching the external handlebar fixing structure 14 thereto.

Figure 11:
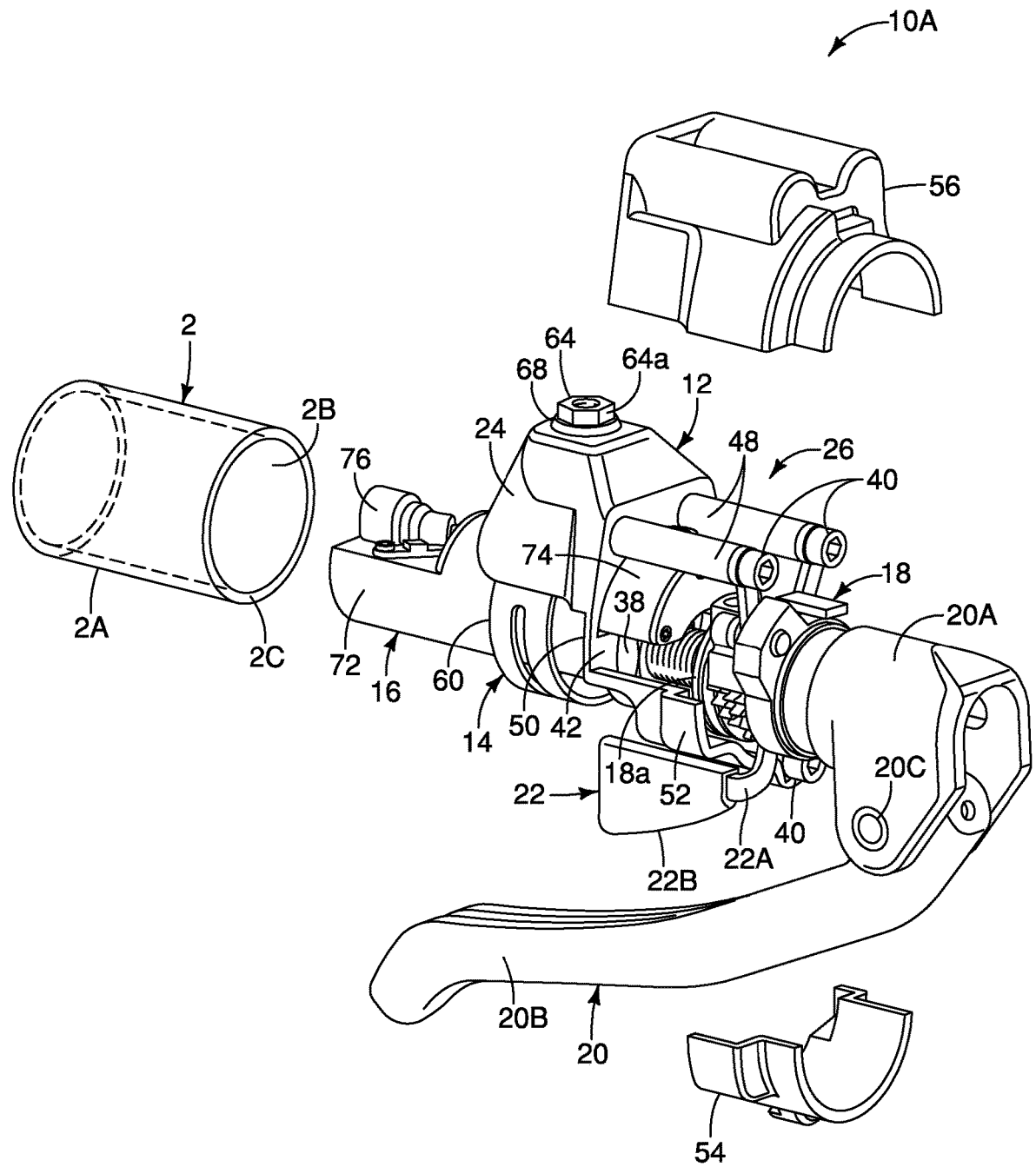
FIG. 11 is a partially exploded perspective view of the right bicycle operating device illustrated in FIGS. 2 to 10.
Figure 12:
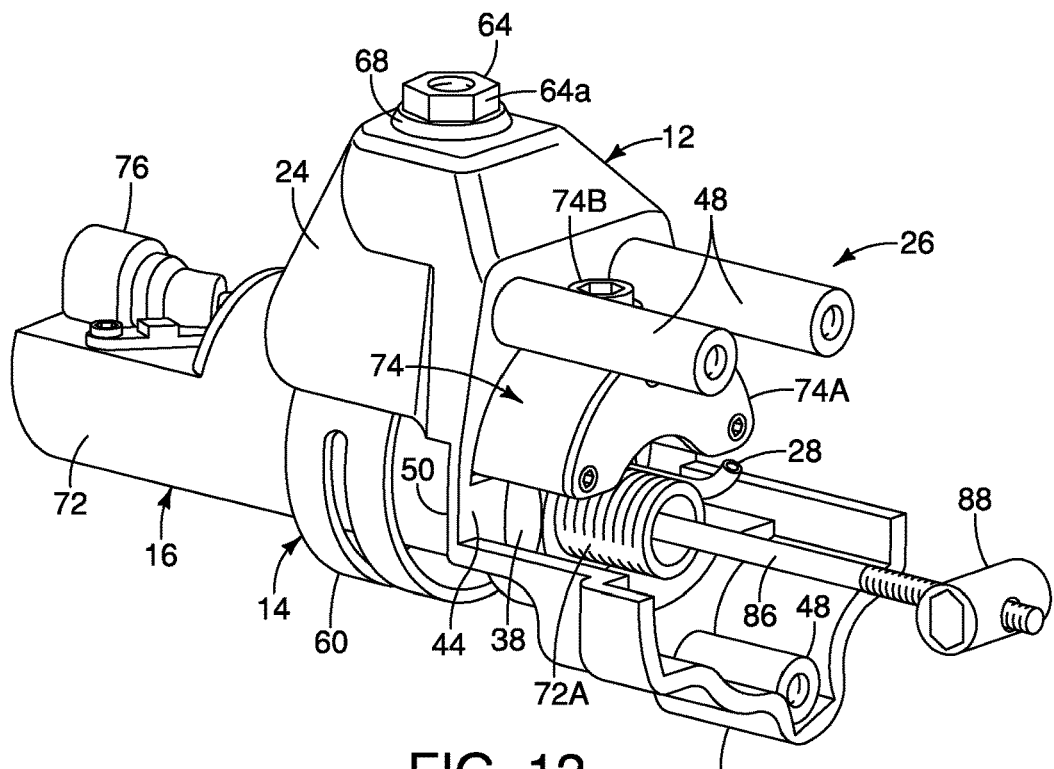
FIG. 12 is a perspective view of selected parts the right bicycle operating device illustrated in FIGS. 2 to 10.
Figure 13:
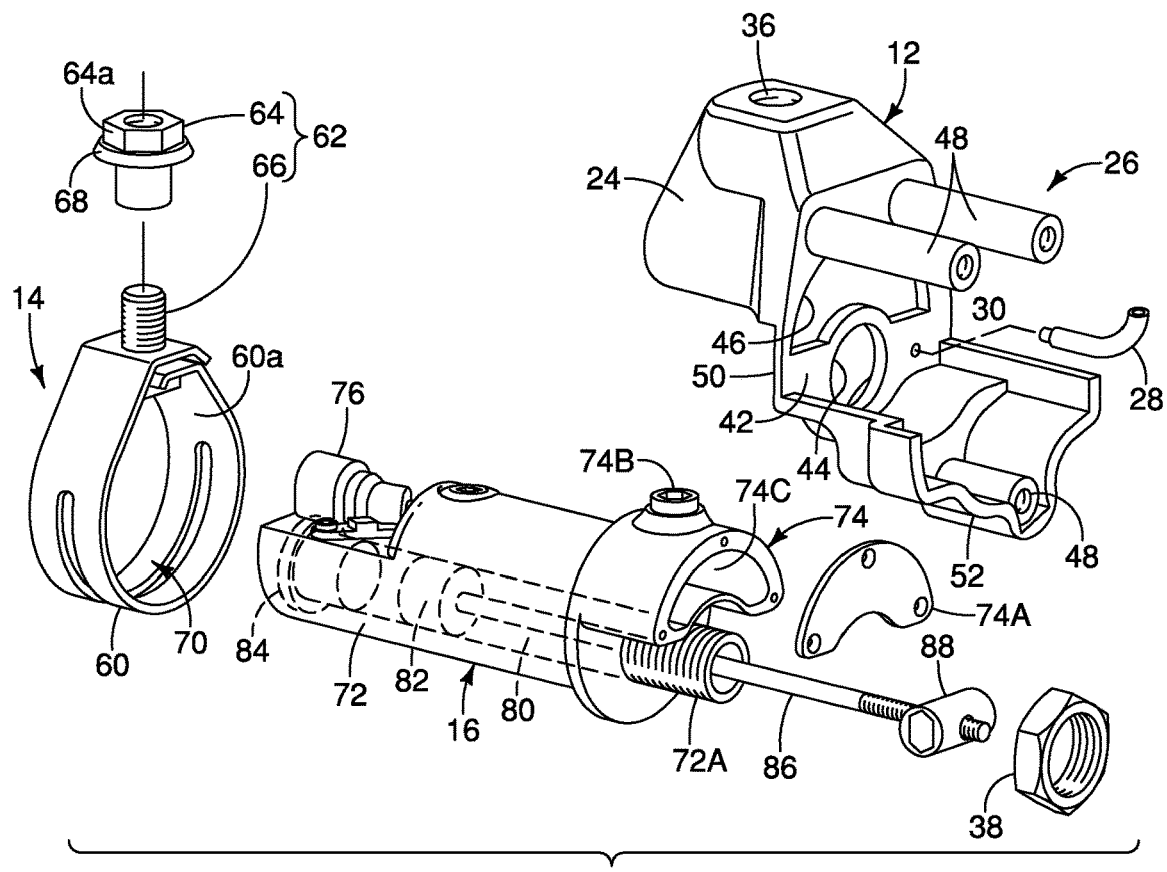
FIG. 13 is a partially exploded perspective view of the selected parts the right bicycle operating device illustrated in FIG. 12.

In the first embodiment, as seen in FIGS. 11 and 12, the operating unit 16 is removably attached to the first attachment portion 24 by a nut 38 (FIG. 12). The additional operating unit 18 is removably attached to the second attachment portion 26 by three screws 40 (FIG. 11). As seen in FIG. 13, the first attachment portion 24 further includes a wall portion 42 having a first opening 44 and a second opening 46. The first and second openings 44 and 46 are configured to accommodate portions of the operating unit 16 therethrough when the operating unit 16 is mounted to the wall portion 42 of the second attachment portion 26 using the nut 38. As seen in FIGS. 11 and 12, the second attachment portion 26 includes three fastener mounting posts 48 that the screws 40 are screwed into for securing the additional operating unit 18. The first attachment portion 24 of the main support body 12 has an abutment 50 that is configured to contact an end 2C of the handlebar 2 in a state where the bicycle operating device 10A is mounted to the handlebar 2. The abutment 50 is defined on the wall portion 42 at an opposite side with respect to the fastener mounting posts 48. Thus, the bicycle operating device 10A is a bar-end operating device, which means that the bicycle operating device 10A is configured to be mounted to a free end of a handlebar and protrude outwardly in an axial direction from the free end of the handlebar.

In the first embodiment, the second attachment portion 26 further includes an integrated cover portion 52 that is integrally formed with the other portions of main support body 12 as a single or one-piece member. As seen in FIGS. 2, 3 and 11, an upper cover portion 54 and a lower cover portion 56 are snap-fitted to the main support body 12 for substantially concealing the additional operating unit 18.

Now, the external handlebar fixing structure 14 will be discussed in more detail with primary reference to FIGS. 2, 3, 12 and 13. Basically, the external handlebar fixing structure 14 is configured to contact the external surface 2A of the handlebar 2 in a state where the bicycle operating device 10A is mounted to the handlebar 2. More specifically, the external handlebar fixing structure 14 includes a handlebar engagement member 60 and a tightening structure 62. The tightening structure 62 displaces the handlebar engagement member 60 towards the main support body 12 to clamp the handlebar 2 between the main support body 12 and the handlebar engagement member 60 in response to tightening of the tightening structure 62.

The tightening structure 62 includes an operated member 64, which is a member that is operated by a user to tighten or loose the tightening structure 62 to displace the handlebar engagement member 60 with respect to the main support body 12. In the first embodiment, the tightening structure 62 includes a fixing bolt 66 that is mounted to the handlebar engagement member 60. The fixing bolt 66 threadedly engages the operated member 64, which is a nut in the first embodiment. In this way, in the first embodiment, the operated member 64 is configured to be coupled to the handlebar engagement member 60. Thus, in the first embodiment, the external handlebar fixing structure 14 includes a band as the handlebar engagement member 60, and the operated member 64 and the fixing bolt 66 as the tightening structure 62. In the first embodiment, a washer 68 is optionally provided on the operated member 64 (i.e., a nut).

The operated member 64 is configured to be disposed opposite to the first operating member 20 with respect to the main support body 12. The operated member 64 has a tool access portion 64a, which is provided on an external surface of the operated member 64. The operated member 64 is configured to displace the band 60 with respect to the main support body 12 so as to clamp the handlebar 2 between the main support body 12 and the band 60 in response to operation of the operated member 64. In this way, the operated member 64 can be easily tightened or loosened.

The band or handlebar engagement member 60 of the external handlebar fixing structure 14 defines a handlebar receiving opening 70 together with the first attachment portions 24 of the main support body 12 for receiving the handlebar 2 therethrough. In particular, in the first embodiment, the band or handlebar engagement member 60 has an inner surface 60a that defines the handlebar receiving opening 70 together with the handlebar contact surface 34 of the first attachment portion 24. The band or handlebar engagement member 60 is a metal band. The band or handlebar engagement member 60 has its ends held together by the fixing bolt 66, which threadedly engages the operated member 64. Basically, the tightening structure 62 is configured to displace the band 60 with respect to the main support body 12 by turning the operated member 64 using the tool access portion 64a to clamp the handlebar 2 between the main support body 12 and the band 60 in response to adjustment of the tightening structure 62.

Now, the operating unit 16 will be discussed in more detail with primary reference to FIGS. 12 and 13. Basically, the operating unit 16 includes a hydraulic cylinder housing 72 that extends through the handlebar receiving opening 70. The hydraulic cylinder housing 72 has a tubular shaft 72A with an external thread that the nut 38 is screwed onto for securing the hydraulic cylinder housing 72 to the main support body 12. The tubular shaft 72A extends through the opening 44 of the wall portion 42. They hydraulic cylinder housing 72 further has a cable passage 72B extending through the wall portion 42 and connected guiding structure 28 so as to guide the cable extending from the additional operating unit 18 to inside the handlebar 2 in a state where the bicycle operating device 10A is mounted to the handlebar 2.

The operating unit 16 further includes a reservoir 74 fluidly communicating with the hydraulic cylinder housing 72. In the first embodiment, the reservoir 74 is integrally formed with the hydraulic cylinder housing 72. The reservoir 74 is closed off by a lid 74A. Preferably, a flexible diaphragm (not shown) is provided in the reservoir 74. The reservoir 74 has a filler port 74B for adding hydraulic fluid into a reservoir cavity 74C (FIG. 13). The reservoir 74 extends into the interior 2B of the handlebar 2 when the bicycle operating device 10A is in the installed state as seen in FIGS. 2, 3, 9 and 10. In particular, the reservoir 74 is located entirely in the upper half of the interior 2B of the handlebar 2 when the bicycle operating device 10A is in the installed state as seen in FIGS. 9 and 10. Thus, the reservoir 74 extends through the handlebar receiving opening 70. As a result, the reservoir 74 is at least partially located radially inward of the handlebar receiving opening 70. The hydraulic cylinder housing 72 includes a hydraulic hose inlet 76 that is located radially inward of the handlebar receiving opening 70. Here, the hydraulic hose inlet 76 is a separate member that is fixed to the hydraulic cylinder housing 72 at a location rearward of the reservoir 74. Thus, as seen in FIGS. 9 and 10, the hydraulic hose inlet 76 is located entirely in the upper half of the interior 2B of the handlebar 2 when the bicycle operating device 10A is in the installed state. As seen in FIG. 3, a hydraulic tube 78 has a one end connected to the hydraulic hose inlet 76. The other end of the hydraulic tube 78 is connected to a hydraulic chamber 80 (FIGS. 10 and 13) of the hydraulic cylinder housing 72.

As seen in FIGS. 10 and 13, a piston 82 is movably disposed in the hydraulic chamber 80 along its longitudinal center axis. The hydraulic chamber 80 has its longitudinal center axis coaxialy arranged with the second id third pivot axes A2 and A3. In the first embodiment, as seen in FIG. 10, the hydraulic chamber 80 is mostly located in the lower half of the interior 2B of the handlebar 2 when the bicycle operating device 10A is in the installed state. Thus, the longitudinal center axis of the hydraulic chamber 80 is located in the lower half of the interior 2B of the handlebar 2 when the bicycle operating device 10A is in the installed state. An end bolt 84 is provided at a open end of the hydraulic cylinder housing 72 so as to constitute an end of the hydraulic chamber 80. The end bolt 84 can be considered a sealing member of the hydraulic cylinder housing 72.

A piston rod 86 operatively connects the first operating member 20 to the piston 82 such that pivotal movement of the first operating member 20 around the first pivot axis A1 cause the piston 82 to move from a rest position (FIG. 4) to an actuated position (FIG. 5) along the longitudinal center axis of the hydraulic chamber 80. The first operating member 20 is pivotally connected to a first end of the piston rod 86 by a pivot pin 88. As seen in FIGS. 4 and 12, the end bolt 84 is disposed on the end of the hydraulic cylinder housing 72 that is opposite of an end through which the piston rod 86 of the piston 82 extends in the movement direction of the piston 82. The piston rod 86 has a second end fixed to the piston 82. In this way, the piston rod 86 pulls the piston 82 as the first operating member 20 is pivoted from the rest position to the operated position as men in FIGS. 4 and 5.

Now, the additional operating unit 18 will be discussed detail with primary reference to FIG. 11. Basically, the additional operating unit 18 is constructed as a mechanical shift unit that is configured to pull and release the inner cable C1 of the control cable C to operate the first transmission. The additional operating unit 18 pulls or releases the inner cable C1 in response to operation of the first and second operating members 20 and 22. Here, in the first embodiment, the operation of the first operating member 20 cause the additional operating unit 18 to pull the inner cable C1, while the operation of the second operating member 22 cause the additional operating unit 18 to release the inner cable C1. Since the structure of the additional operating unit 18 can be practically any type of mechanical operating unit 18 as needed and/or desired, the additional operating unit 18 will not be discussed or illustrated in detail herein.

The additional operating unit 18 can pull and release the cable C1 in response to operation of the first and second operating members 20 and 22 in the same manner as the shift operating unit that is described in U.S. Patent Application Publication No. 2012/0297919. However, the mounting of the additional operating unit 18 to the main support body 12 and the arrangement of the first and second operating members 20 and 22 are different from the shift control mechanism disclosed in this U.S. Patent Publication. In other words, the shift control mechanism of this U.S. Patent Publication would need to be adapted to be used with the main support body 12 and the operating unit 16.

Of course, the additional operating unit 18 is not limited to this arrangement in which two operating members are used to operate the additional operating unit 18. For example, the additional operating unit 18 can be configured such that first (single) operating member performs a braking operation, a cable pulling operation and a cable releasing operation in the same manner as the shift control mechanism that is described in U.S. Patent Application Publication No. 2010/0083788. Of course, the shift control mechanism would need to be adapted to be used with the main support body 12 and the operating unit 16.

Figure 14:
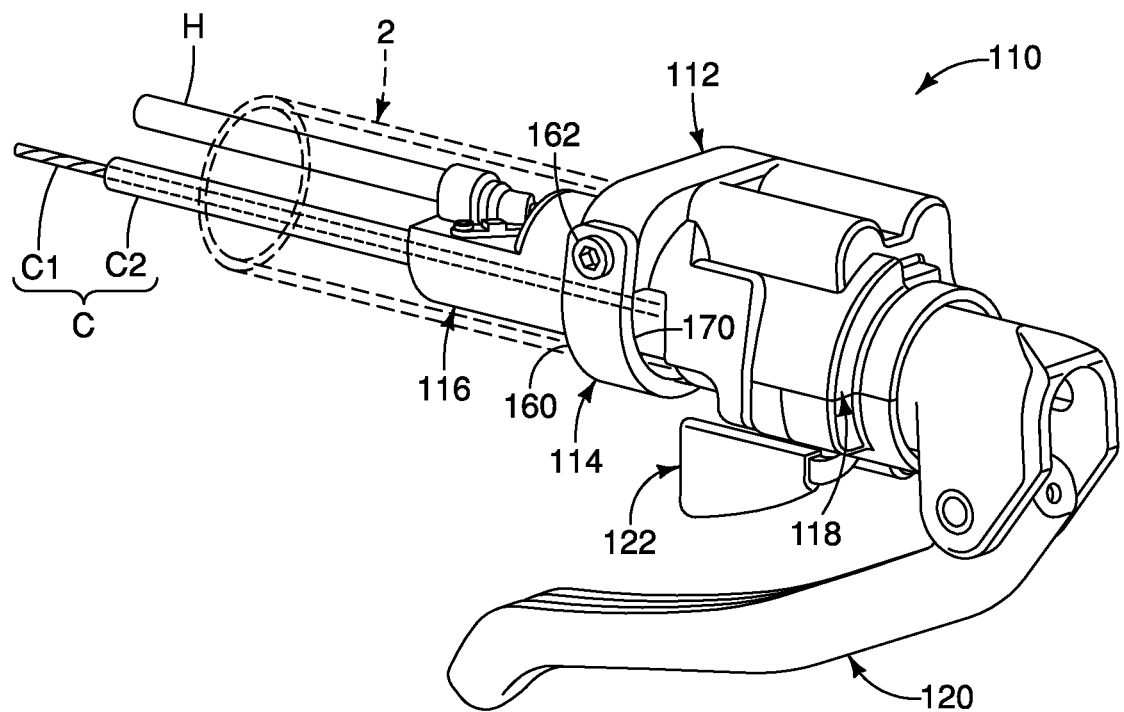
FIG. 14 is an outside perspective view of a right bicycle operating device in accordance with a second embodiment.

Referring now to FIG. 14, a right bicycle operating device 110 is illustrated in accordance with a second embodiment. The bicycle operating device 110 is identical to the bicycle operating device 10A, discussed above, except that the mounting configuration of the bicycle operating device 110 to the handlebar 2 has been changed. The bicycle operating device 110 basically includes a main support body 112, an external handlebar fixing structure 114, an operating unit 116 and an additional operating unit 118. The operating unit 116 and the additional operating unit 118 are identical to the operating unit 16 and the additional operating unit 18 of the first embodiment. Thus, the operating unit 116 is connected to the hydraulic hose H, while the additional operating unit 118 is connected to the control cable C.

The external handlebar fixing structure 114 includes a clamp 160 and a tightening structure 162. The clamp 160 is disposed on the main support body 112. In the second embodiment, the clamp 160 is a non-hinged clamp in which a portion of the clamp 160 is integrally formed with a portion of the main support body 112. Alternatively, the clamp 160 can be a separate part that is attached to the main support body 112. Here, the tightening structure 162 is a fixing bolt that connects opposite end portions of the clamp 160. The tightening structure 162 is coupled to the clamp 160 to change an effective internal diameter of a handlebar receiving opening 170 of the clamp 160 in response to adjustment of the tightening structure 162. In view of the similarities between the bicycle operating devices 10A and 110, the bicycle operating device 110 will not be discussed in further detail for the sake of brevity.

Figure 15:
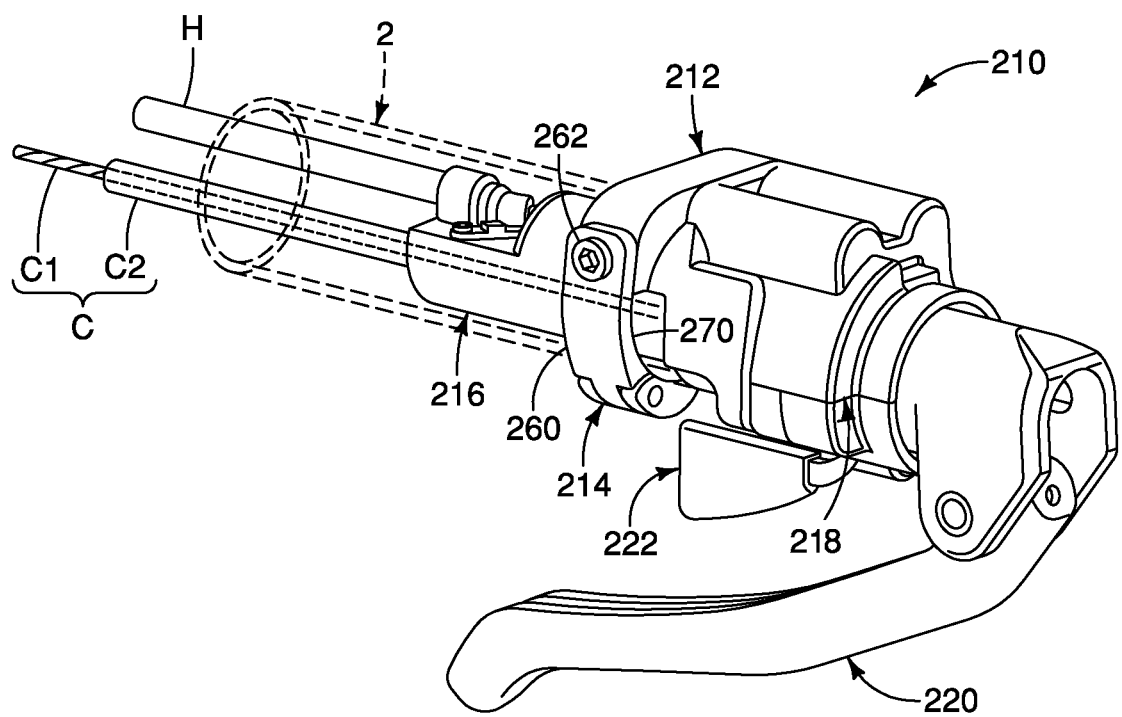
FIG. 15 is an outside perspective view of a right bicycle operating device in accordance with a third embodiment.

Referring now to FIG. 15, a right bicycle operating device 210 is illustrated in accordance with a third embodiment. The bicycle operating device 210 is identical to the bicycle operating device 10A, discussed above, except that the mounting configuration of the bicycle operating device 210 to the handlebar 2 has been changed. The bicycle operating device 210 basically includes a main support body 212, an external handlebar fixing structure 214, an operating unit 216 and an additional operating unit 218. The operating unit 216 and the additional operating unit 218 are identical to the operating unit 16 and the additional operating unit 18 of the first embodiment. Thus, the operating unit 216 is connected to the hydraulic hose H, while the additional operating unit 218 is connected to the control cable C.

The external handlebar fixing structure 214 includes a clamp 260 and a tightening structure 262. The clamp 260 is disposed on the main support body 212. In the third embodiment, the clamp 260 is a hinged clamp in which a portion of the clamp 260 is integrally formed with a portion of the main support body 212. Alternatively, the clamp 260 can be a separate part that is attached to the main support body 212. Here, the tightening structure 262 is a fixing bolt that connects opposite end portions of the clamp 260. The tightening structure 262 is coupled to the clamp 260 to change an effective internal diameter of a handlebar receiving opening 270 of the clamp 260 in response to adjustment of the tightening structure 262. In view of the similarities between the bicycle operating devices 10A and 210, the bicycle operating device 210 will not be discussed in further detail for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
   a handlebar fixing structure for fixing the bicycle operating device to a handlebar, the handlebar fixing structure having a handlebar receiving opening for receiving the handlebar therethrough;
   a main support body;
   a first operating member pivotally coupled to the main support body about a first pivot axis;
   a hydraulic brake operating unit mounted to the main support body and being configured to be partially received in an end of a handlebar, the hydraulic brake operating unit having a piston that is pulled in response to operation of the first operating member between a rest position to an operated position, the hydraulic brake operating unit further having a hydraulic cylinder housing that houses a piston and is fixed to the main support body, the hydraulic cylinder housing including a hydraulic hose inlet;
   an additional operating unit mounted to the main support body; and
   a second operating member configured to actuate the additional operating unit, the second operating member being pivotable about a second pivot axis, the second pivot axis being arranged above the first pivot axis while in a state in which the main support body is attached to the handlebar, the hydraulic hose inlet being located radially inward of the handlebar receiving opening as viewed along the direction of the second pivot axis.

2. The bicycle operating device according to claim 1, wherein
   the additional operating unit is an electric operating unit.

3. The bicycle operating device according to claim 1, wherein
   the additional operating unit is a shift operating unit.

4. The bicycle operating device according to claim 3, wherein
   the additional operating unit is an electric shift operating unit.

5. The bicycle operating device according to claim 3, wherein
   the shift operating unit is fixedly mounted within the main support body.

6. The bicycle operating device according to claim 5, wherein
   the shift operating unit is arranged between a gripping portion of the handlebar and the first operating member.

7. The bicycle operating device according to claim 6, wherein
   the hydraulic brake operating unit includes a reservoir fluidly communicating with the hydraulic cylinder housing, the reservoir being at least in par substantially overlapping with the hydraulic cylinder housing in a movement direction of the piston.

8. The bicycle operating device according to claim 7, wherein
   the hydraulic brake operating unit is connected to a hydraulic hose and the shift operating unit is connected to a control cable, the hydraulic hose being arranged above the control cable when the bicycle operating device is mounted on a bicycle.

9. The bicycle operating device according to claim 8, further comprising
   a hydraulic tube operatively connecting the hydraulic hose inlet to the hydraulic cylinder housing.

10. The bicycle operating device according to claim 7, wherein
    the first operating member is pivotally connected to a first and of a piston rod by a pivot pin, the pivot pin being threadedly engaged with the piston rod.

11. The bicycle operating device according to claim 1, wherein the additional operating unit is fixedly mounted within the main support body.

12. The bicycle operating device according to claim 1, wherein the additional operating unit is arranged between a gripping portion of the handlebar and the first operating member.

13. The bicycle operating device according to claim 1, wherein
    the hydraulic brake operating unit includes a reservoir fluidly communicating with the hydraulic cylinder housing, the reservoir being at least in part substantially overlapping with the hydraulic cylinder housing in a movement direction of the piston.

14. The bicycle operating device according to claim 13, further comprising
    a hydraulic tube operatively connecting the hydraulic hose inlet to the hydraulic cylinder housing.

15. The bicycle operating device according to claim 14, wherein
    the hydraulic tube is at least partially provided on the hydraulic cylinder housing.

16. The bicycle operating device according claim 13, further comprising
    a end bolt provided at an open end of the hydraulic cylinder housing that is opposite of a end through which a piston rod of the piston extends in the movement direction of the piston.

17. The bicycle operating device according to claim 1, wherein
    the hydraulic brake operating unit is connected to a hydraulic hose and the additional operating unit is connected to a control cable, the hydraulic hose being arranged above the control cable when the bicycle operating device is mounted on a bicycle.

18. The bicycle operating device according to claim 1, wherein the first operating member is pivotally connected to a first and of a piston rod by a pivot pin, the pivot pin being threadedly engaged with the piston rod.

19. A bicycle operating device comprising:
a handlebar fixing structure for fixing the bicycle operating device to a handlebar, the handlebar fixing structure having a handlebar receiving opening for receiving the handlebar therethough;
a main support body;
a first operating member pivotally coupled to the main support body about a first pivot axis;
a hydraulic brake operating unit mounted to the main support body and being configured to be partially received in an end of a handlebar, the hydraulic brake operating unit having a piston that is pulled in response to operation of the first operating member between a rest position to an operated position, the hydraulic brake operating unit having a fluid reservoir that extends through the handlebar receiving opening of the handlebar fixing structure;
an additional operating unit mounted to the main support body; and
a second operating member configured to actuate the additional operating unit, the second operating member being pivotable about a second pivot axis, the second pivot axis being arranged above the first pivot axis while in a state in which the main support body is attached to the handlebar.

* * * * *